US004001623B2

United States Statutory Invention Registration [19]

[11] Reg. Number: H1623

[45] Published: Jan. 7, 1997

Reed et al.

[54] FROZEN BAG OF LIQUID THAWER UTILIZING HEAT AT AMBIENT TEMPERATURE

[76] Inventors: William S. Reed, 182 S. Lake St., Grayslake, Ill. 60030; John M. Garcia, 11525 S. Nagle Ave., Worth, Ill. 60482

[21] Appl. No.: 268,906

[22] Filed: Jun. 29, 1994

[51] Int. Cl.[6] ..... H05B 3/06

[52] U.S. Cl. ..... 219/524; 99/372

[58] Field of Search ..... 219/524, 525, 219/243; 99/372, 377, 378, 379; 100/295, 93 P; 392/470

[56] References Cited

U.S. PATENT DOCUMENTS

| | | | |
|---|---|---|---|
| 2,644,151 | 6/1953 | Krueger | 100/93 P |
| 3,590,215 | 6/1971 | Anderson et al. | 219/525 |
| 4,102,256 | 7/1978 | John et al. | 219/525 |
| 4,117,881 | 10/1978 | Williams et al. | 392/470 |
| 4,206,345 | 6/1980 | Maass et al. | 219/524 |
| 4,314,143 | 2/1982 | Bilstad et al. | 219/497 |
| 4,473,739 | 9/1984 | Scheiwe et al. | 219/302 |

OTHER PUBLICATIONS

Copy of "Thaw Master" product packaging, Naturale Home Products. Ltd., 2 pages, date of packaging is unknown.

Copy of "Miracle Thaw" product literature, Montgomery Ward, 2 pages, date of literature is unknown.

*Primary Examiner*—Bernarr E. Gregory

[57] ABSTRACT

The present invention provides a bag thawer 10 for thawing at least one bag of frozen liquid. Generally, the frozen bags of liquid are I.V. bags 42 containing medical solutions. The bag thawer 10 provides an upper contact plate 12 sized to contain a first quantity of heat at room temperature and a lower contact plate 14 sized to contain a second quantity of heat at room temperature. The total heat contained in the upper and lower contact plates 12, 14 is sufficient to thaw the frozen I.V. bags 42 without applying additional heat to I.V. bag 42 or rewarming contact plates 12, 14. The upper and lower contact plates 12, 14 are hinged together by a hinge 16. The upper contact plate 12 is biased by spring 36 towards the lower contact plate 14. In one alternative embodiment, a pair of heaters 116, 118 are placed in contact with the contact plates 112, 114 to maintain the contact plates 112, 114 at approximately room temperature.

29 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FROZEN BAG OF LIQUID THAWER UTILIZING HEAT AT AMBIENT TEMPERATURE

FIELD OF THE INVENTION

This invention is generally directed to a bag thawer device for thawing frozen bags of liquid. More specifically, in the medical field this invention is directed to a bag thawer which utilizes ambient room temperature for thawing frozen bags of intravenous administration solutions.

BACKGROUND OF THE INVENTION

In the medical field medical solutions are commonly administered to patients by intravenous administration (I.V.) techniques. Frequently, the medical solution is contained within an I.V. bag which is stored, for example, at a hospital pharmacy. The pharmacy freezes many I.V. bags containing medical solutions to obtain a longer storage life. Of course, the frozen bag of solution must be thawed prior to administration to a patient. Frozen I.V. bags are typically thawed to a room temperature of approximately 72° F. or approximately 75° F. After the bag is thawed, the pharmacy may add medications to the solution and apply appropriate labeling to the bag prior to delivery to the patient.

Various techniques and devices have been utilized to thaw a frozen bag of I.V. solution. For example, a frozen bag of solution can be thawed by placing the bag on a countertop and allowing ambient air to warm the frozen solution. However, the countertop thawing method requires use of valuable pharmacy counter space for an extended period of time and creates a messy residue of condensation. The condensation on the bag may interfere with application of the label onto the bag. Furthermore, thawing a frozen bag by contact with ambient air requires an extended period of time because air is a relatively poor heat conductor. This long thawing time may be unacceptable when a patient requires an I.V. bag in an emergency situation.

A frozen bag of solution can be thawed by blowing ambient air at room temperature over the frozen bag. However, this method of thawing exhibits the problems of the countertop thawing method. Although blowing air over the frozen bag reduces thawing time, the thawing time may remain unacceptably long in emergency situations.

A frozen bag of solution can be thawed by blowing heated air over the frozen bag. However, a heated air thawing device exhibits the problems of the countertop thawing method and the blowing ambient air thawing method. Although, blowing heated air over the frozen bag reduces thawing time, the thawing time may remain unacceptably long in emergency situations. The thawing time can be reduced by increasing the temperature of the heated air. However, forced thawing of medical solutions at high temperature is undesirable.

A frozen bag of solution can be thawed by exposing the frozen bag to microwaves. However, forced thawing of medical solutions at high temperature is undesirable.

A frozen bag of solution can be thawed by immersion of the bag into a water bath. However, a water bath thawing device can be cumbersome and messy and requires periodic changing of the water bath. Further, water remaining on the outside of the bag after thawing may interfere with application of the label onto the bag.

Therefore, a need exists to improve the methods of and the devices for thawing frozen bags of medical solutions. The present invention satisfies this need. The present invention quickly and efficiently thaws frozen bags of solution without subjecting the solutions to excessive heat. The present invention thaws frozen bags of solution by placing the frozen bags under pressure between contact plates at room temperature. The present invention quickly transfers heat at room temperature from the contact plates to the frozen solution to thaw the solution.

Accordingly, one advantage of the present invention is to improve devices which thaw frozen bags of liquid.

Another advantage of the present invention is to thaw frozen bags of liquid without exposing the liquid to an excessive temperature.

Another advantage of the present invention is to thaw frozen bags of liquid rapidly.

Another advantage of the present invention is to inhibit condensation from forming on the bags of liquid.

Additional advantages of the present invention will be apparent from reviewing this specification, the drawings, and the claims.

SUMMARY OF THE INVENTION

The present invention provides a bag thawer for thawing at least one bag of frozen liquid. Generally, the frozen bags of liquid are I.V. bags containing medical solutions. The bag thawer provides an upper contact plate sized to contain a first quantity of heat at room temperature and a lower contact plate sized to contain a second quantity of heat at room temperature. The upper and lower contact plates are sized such that the total heat contained in the upper and lower contact plates is sufficient to thaw the frozen I.V. bags without applying additional heat to the I.V. bags or rewarming the contact plates. The upper and lower contact plates are hinged together and the upper contact plate is biased towards the lower contact plate. The frozen I.V. bags are placed in between the upper and lower contact plates for thawing.

In one alternative embodiment, the present bag thawer invention provides a pair of contact plates which contact the frozen bags of liquid. A pair of heaters are placed in contact with the contact plates to maintain the contact plates at approximately room temperature. The heaters are placed on sides of the contact plates furthest away from the frozen bags of liquid. A heater control controls the temperature of the heaters. The pair of contact plates are biased towards the frozen bags of liquid.

DETAILED DESCRIPTION OF PREFERRED EMBODIMENTS

Figure 1:
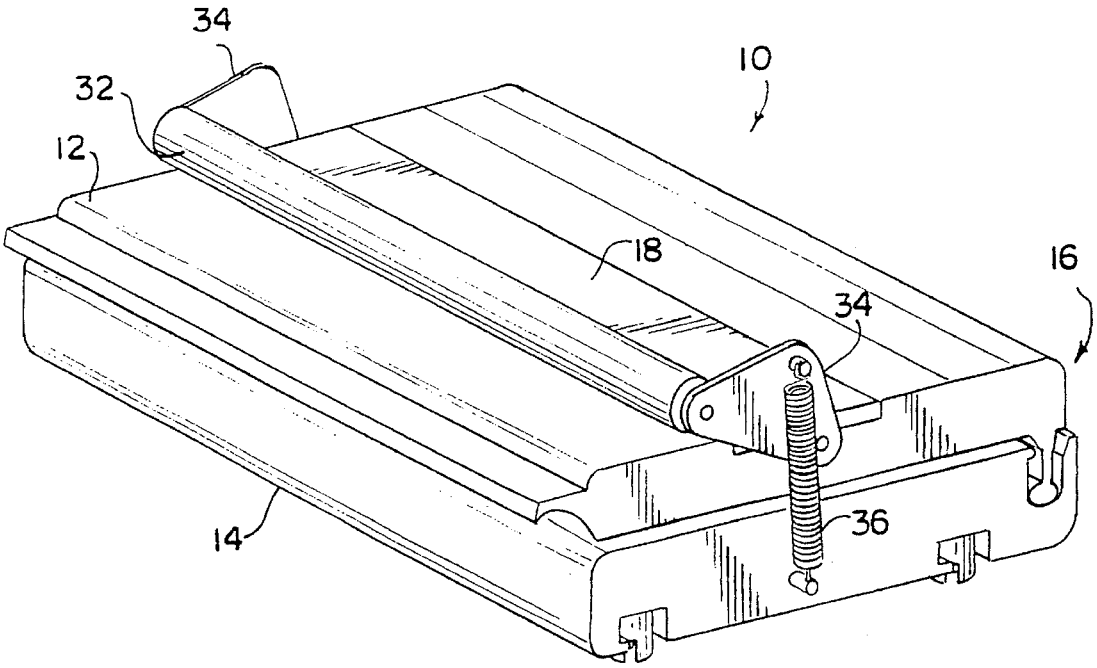
FIG. 1 is a perspective view of a bag thawer in accordance with the present invention.

FIG. 1 shows a perspective view of a bag thawer 10 made in accordance with the principles of the present invention. The bag thawer 10 comprises an upper contact plate 12 and a lower contact plate 14. The upper contact plate 12 is movably connected to lower contact plate 14 by a hinge 16. The bag thawer 10 further comprises a clamp 18 for biasing upper contact plate 12 towards lower contact plate 14.

Figure 2:
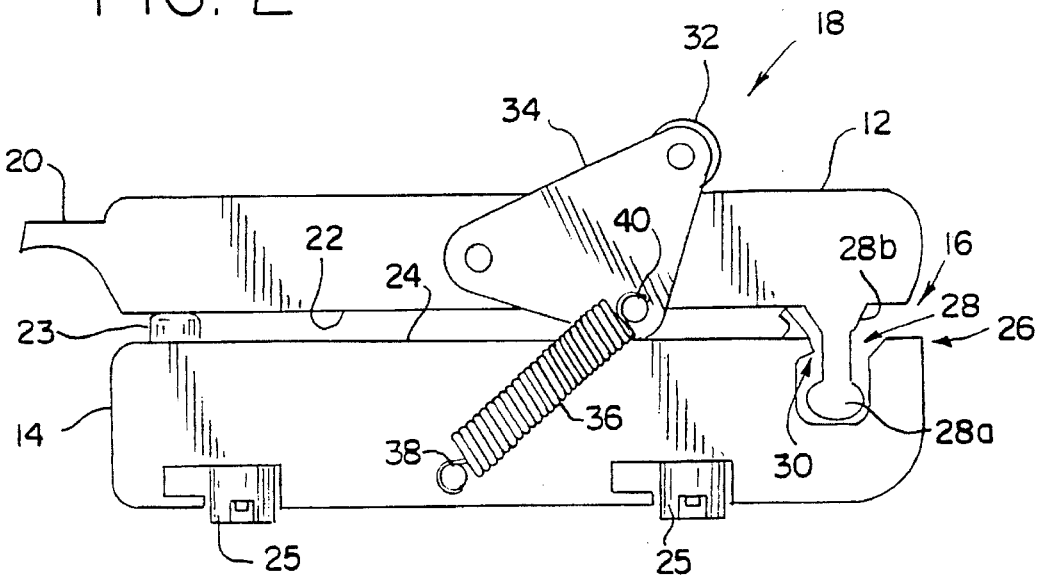
FIG. 2 is an end view of the bag thawer of FIG. 1 showing the bag thawer in an unclamped position.

FIG. 2 shows an end view of bag thawer 10. The upper contact plate 12 provides a handle 20. Preferably, handle 20 is integral with upper contact plate 12. Handle 20 is provided to lift upper contact plate 12 away from lower contact plate 14 and to lower upper contact plate 12 towards lower contact plate 14. The upper contact plate 12 also provides an upper contact surface 22. Preferably, upper contact surface 22 is substantially flat; although, upper contact surface 22 may have a contoured shape. The upper contact plate 12 is constructed from a material selected for the material's heat transfer and heat capacity properties. For example, upper contact plate 12 may be constructed from aluminum.

Figure 4:
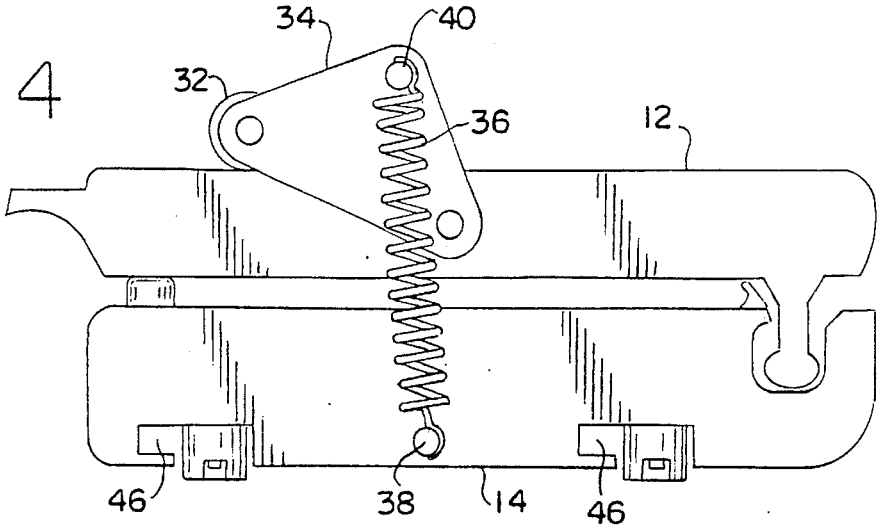
FIG. 4 is an end view of the bag thawer of FIG. 1 showing the bag thawer in a clamped position.
Figure 6:
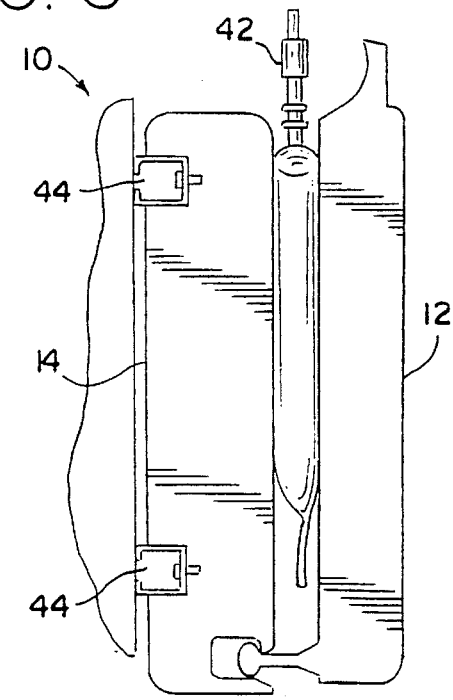
FIG. 6 is an end view of a bag thawer of FIG. 1 showing the bag thawer mounted on a wall.

The lower contact plate 14 is also constructed of a material selected for the material's heat transfer and heat capacity properties. For example, lower contact plate 14 may be constructed from aluminum. The lower contact plate 14 has a lower contact surface 24. Preferably, lower contact surface 24 is substantially flat; although, lower contact surface 24 may have a contoured shape. At least one bumper 23 is removably attached to lower contact surface 24. Bumper 23 is constructed out of a resilient material, such as rubber, and provides a cushion and space between upper contact plate 12 and lower contact plate 14. The bumper 23 may provide sufficient space between contact plates 12, 14 to allow clearance for an I.V. administration port on the I.V. bag. Feet 25 are removably attached to lower contact plate 14. Feet 25 support bag thawer 10 when bag thawer 10 is placed on a table or countertop. Lower contact plate 14 is adapted to be mounted on a wall. As shown in FIG. 6, a bracket 44 can be fastened to lower contact plate 14 for mounting bag thawer 10 to the wall. Alternatively, as shown in FIG. 4, lower contact plate 14 may provide a support recess 46 which cooperates with a support bracket mounted onto a wall.

The sizes of upper and lower contact plates 12, 14 are selected such that upper and lower contact plates 12, 14 contain sufficient heat at room temperature to thaw a desired number of frozen I.V. bags. More specifically, upper contact plate 12 is sized such that upper contact plate 12 contains a first quantity of heat at room temperature. Upper contact plate 12 contains the first quantity of heat due to upper contact plate's 12 size of mass. Upper contact plate 12 has a temperature of approximately room temperature because upper contact plate 12 is allowed to contact ambient room temperature air. If upper contact plate 12 is cooler than room temperature, alter sufficient time the ambient room air will warm upper contact plate 12 to room temperature. One size of a preferred solid aluminum upper contact plate 12 has been found to be approximately 16½ inches wide× 8¼ inches deep ×1 inch thick. Likewise, lower contact plate 14 is sized such that lower contact plate 14 contains a second quantity of heat at room temperature. Lower contact plate 14 contains the second quantity of heat due to lower contact plate's 14 size of mass. Lower contact plate 14 has a temperature of approximately room temperature because lower contact plate 14 is allowed to contact ambient room temperature air. If lower contact plate 14 is cooler than room temperature, after sufficient time the ambient room air will warm lower contact plate 14 to room temperature. One size of a preferred solid aluminum lower contact plate 14 has been found to be approximately 16½ inches wide×7⅝ inches deep×1½ inches thick. For reference, the 16½ inch width is along the front of bag thawer 10 as can be seen in FIG. 1. The first quantity of heat contained in the mass of upper contact plate 12 combined with the second quantity of heat contained in the mass of lower contact plate 14 is the total amount of heat contained in bag thawer 10. The total amount of heat at room temperature contained in bag thawer 10 is sufficient to thaw a desired number of frozen I.V. bags without applying any additional heat to the I.V. bags or rewarming contact plates 12, 14. For example, a bag thawer 10 sized as set forth above has been found to thaw four 100 ml frozen I.V. bags in less than 10 minutes.

Figure 3:
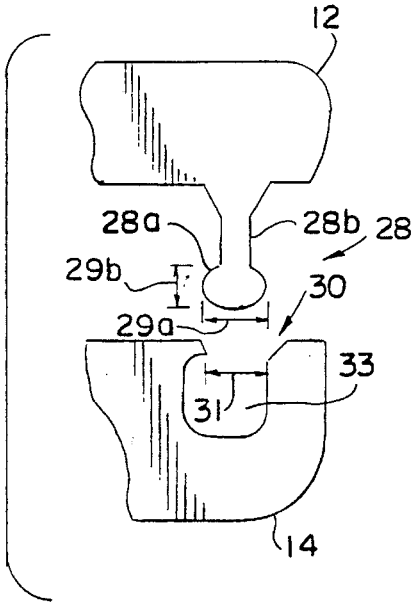
FIG. 3 is a partial, detail view of the bag thawer of FIG. 2 showing a hinge which is separated.

As shown in FIG. 2, hinge 16 movably connects upper contact plate 12 to lower contact plate 14 at a hinge location 26. Hinge 16 allows upper contact plate 12 to pivot in relation to lower contact plate 14. Upper contact plate 12 pivots around an axis of rotation at hinge location 26. Preferably, hinge 16 also allows upper contact plate 12 to move away from lower contact plate 14 at hinge location 26. Specifically, with contact plates 12, 14 positioned horizontally as shown in FIG. 2, upper contact plate 12 can move in a linear, vertical direction. The vertical direction is perpendicular to the axis of pivotal rotation of hinge 16. As such, hinge 16 provides upper contact plate 12 with both pivotal and linear movement at hinge location 26. In a preferred embodiment, hinge 16 comprises a projection 28 and a projection seat 30. The projection 28 is integral with and extends from upper contact plate 12. The projection 28 comprises an enlarged end **28*a* and a shaft 28*b* which connects enlarged end 28*a* to upper contact plate 12. As shown in FIG. 3, the enlarged end 28*a* has a width 29*b* and a height 29*b*. The width 29*b* is greater than the height 29*b*. Preferably, width 29*b* and height 29*b* form an oblong shaped enlarged end 28*a*. The enlarged end 28*a* cooperates with projection seat 30** as described below.

Projection seat 30 is defined by an opening 31 and a recess 33 in lower contact plate 14. Opening 31 is smaller than width **29*b* and larger than height 29*b*. As such, enlarged end 28*a* can pass through opening 31 when enlarged end 28*a* is pivoted so that height 29*b* faces opening 31. Similarly, enlarged end 28*a* cannot pass through opening 31 when enlarged end 28*a* is pivoted so that width 29*b* faces opening 31. The recess 33 is sufficiently large to allow enlarged end 28*a* to pivot and to move vertically regardless of the pivotal orientation of enlarged end 28*a*. This configuration of hinge 16 allows complete separation of contact plates 12, 14 at hinge location 26 only when contact plate 12 is pivoted to a position where the height 29*b* of enlarged end 28*a* can pass through opening 31 of projection seat 30. Thus, projection 28 and projection seat 30 are shaped and sized such that projection 28 is both pivotal in projection seat 30 and linearly moveable in a vertical direction perpendicular to the axis of pivotal rotation. The projection 28 and projection seat 30 preferably extend along substantially the entire width of bag thawer 10**.

The end view of bag thawer 10 in FIG. 2 also shows an end view of clamp 18. Clamp 18 comprises a clamp handle 32, a pair of rocker arms 34, and a pair of springs 36. One spring 36 and one rocker arm 34 are positioned at one side of bag thawer 10 and the other spring 36 and rocker arm 34 are positioned at the opposite side of bag thawer 10. Spring 36 has a first spring end 38 and a second spring end 40. The first spring end 38 is attached to lower contact plate 30. The second spring end 40 is attached to rocker arm 34. Preferably, first and second spring ends 38, 40 are removably attached to lower contact plate 14 and rocker arm 34, respectively. Rocker arm 34 is pivotally connected to upper contact plate 12. Clamp handle 32 is connected to both rocker arms 34.

When clamp 18 is in the unclamped position, as shown in FIG. 2, spring 36 is in a relaxed, unstretched condition. Alternatively, spring 36 may be in a slightly stretched condition when bag thawer 10 is unclamped. Thus, in the unclamped position spring 36 exerts a minimal force or zero force biasing upper contact plate 12 towards lower contact plate 14.

FIG. 4 shows the end view of FIG. 2 with bag thawer 10 in the clamped position. The rocker arm 34 is pivoted from the unclamped position to the clamped position. As rocker arm 34 is pivoted from the unclamped position to the clamped position spring 36 is stretched. Thus, in the clamped position, spring 36 exerts an increased force biasing upper contact plate 12 towards lower contact plate 14. The biasing force can be varied by selecting appropriate springs 36 and varying the amount of spring stretch. A desirable combined biasing force from the pair of springs 36 has been found to be approximately 15 lbs. to 30 lbs. In addition to the biasing force from the pair of springs 36, a gravitational force may bias upper contact plate 12 towards lower contact plate 14. The gravitational force on an upper contact plate 12 having a size of the dimensions discussed above has been found to be approximately 15 lbs. As such, the pair of springs 36 together with gravity may exert a biasing force of approximately 30 lbs. to 45 lbs.

Figure 5:
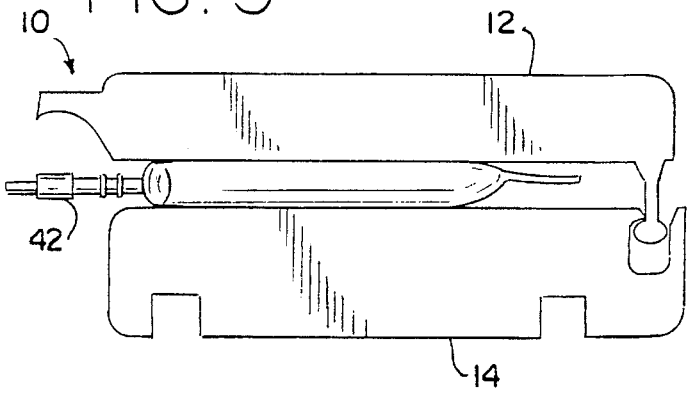
FIG. 5 is an end view of a bag thawer of FIG. 1 showing an I.V. bag positioned in the bag thawer.

In operation of bag thawer 10 from the unclamped position, upper contact plate 12 is lifted away from lower contact plate 14 by handle 20. A frozen I.V. bag 42 is placed on the lower contact surface 24. Preferably, I.V. bag 42 is positioned so that the I.V. bag administration ports will not be pinched between the upper and lower contact plates 12, 14. The upper contact plate 12 is lowered to allow upper contact surface 22 to contact I.V. bag 42 as shown in FIG. 5. The clamp handle 32 is pulled to pivot rocker arms 34 to the clamped position as shown in FIG. 4. As such, springs 36 are stretched and upper contact plate 12 is biased towards lower contact plate 14. Because I.V. bag 42 may be highly deformed due to the freezing process, upper and lower contact plates 12, 14 may rest unparallel to each other. The dual movement of hinge 16 allows upper and lower contact surfaces 22, 24 to adjust position to maximize contact with I.V. bag 42.

With upper and lower contact surfaces 22, 24 in contact with I.V. bag 42 heat will start to transfer from upper and lower contact plates 12, 14 to I.V. bag 42. The rate of heat transfer is dependent on a heat transfer coefficient, the contact area, and a temperature differential between I.V. bag 42 and contact surfaces 22, 24. The area of contact between upper and lower contact surfaces 22, 24 with I.V. bag 42 may initially be limited because I.V. bag 42 may be deformed. However, the contact area is the first area to thaw. Alter only a small portion of I.V. bag 42 has thawed, there is sufficient fluid, with the clamping force, to cause upper and lower contact plates 12, 14 to realign and to increase the contact area. The heat transfer rate increases with the increase in contact area. Additionally, the formation of condensation on I.V. bag 42 is minimal or eliminated. Condensation does not form because thawing occurs in contact with contact plates 12, 14 and not in contact with ambient air which contains moisture.

The clamp 18 is returned to the unclamped position after I.V. bag 42 is thawed. The upper contact plate 12 is lifted by handle 20 and thawed I.V. bag 42 is removed. Bag thawer 10 is allowed to return to room temperature by transferring heat from ambient air to bag thawer 10.

Bag thawer 10 may be sized to thaw multiple frozen I.V. bags 42 during a single thawing operation. Further, bag thawer 10 may be sized to contain sufficient heat to thaw multiple frozen I.V. bags 42 during more than one thawing operation without reheating bag thawer 10 between thawing operations. For example, a bag thawer 10 may be sized to thaw tour 100 ml frozen I.V. bags 42 in less than 10 minutes.

Figure 7:
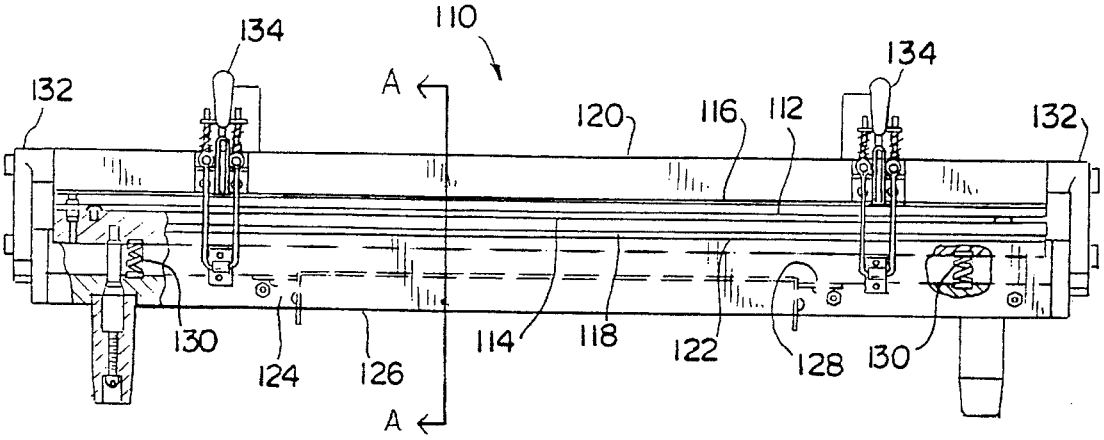
FIG. 7 is a front elevational view of another embodiment of a bag thawer in accordance with the present invention.

FIG. 7 shows a front elevational view of a bag thawer 110 in accordance with the present invention. Bag thawer 110 provides a pair of contact plates 112, 114. Contact plate 112 is an upper contact plate and contact plate 114 is a lower contact plate. When thawing a frozen I.V. bag 42, I.V. bag 42 is placed between contact plates 112, 114. In this manner, contact plates 112, 114 contact I.V. bag 42 on opposite sides of I.V. bag 42. In this embodiment of the invention, contact plates 112, 114 may not be sized to contain sufficient heat at room temperature to thaw frozen I.V. bag 42.

Rather, a pair of heaters 116, 118 are provided to supply sufficient heat to thaw frozen I.V. bag 42. Each one of heaters 116, 118 is coupled to one contact plate 112, 114 on a side of the contact plate 112, 114 away from I.V. bag 42. Heater 116 is an upper heater and contacts upper contact plate 112 on the side of upper contact plate 112 away from I.V. bag 42. Likewise, heater 118 is a lower heater and contacts lower contact plate 114 on the side of lower contact plate 114 away from I.V. bag 42. With this construction, heat from heaters 116, 118 must pass through contact plates 112, 114 to reach I.V. bag 42.

A pair of back plates 120, 122 are provided to support heaters 116, 118 and contact plates 112, 114. Each back plate 120, 122 is coupled to one heater 116, 118 on a side of the heater 116, 118 away from the contact plate 112, 114. The back plate 120 is an upper back plate and contacts upper heater 116 on a side of upper to heater 116 away from upper contact plate 112. Likewise, back plate 122 is a lower back plate and contacts lower heater 118 on a side of lower heater 118 away from lower contact plate 114.

The lower back plate 122 is supported on a base 124 which supports bag thawer 110 on a table. The base 124 has a bottom side 126 facing the table and a top side 128 facing away from the table. A resilient support 130, such as a set of springs, flexibly supports one of the pair of back plates on the top side 128 of base 124. More specifically, springs 130 contact top side 128 and lower back plate 122, to flexibly support lower back plate 122. The flexible support of lower back plate 122 allows parallel and unparallel alignment of contact plates 112, 114. A flexible alignment of contact plates 112, 114 provides improved contact with frozen I.V. bag 42 when I.V. bag 42 has an irregular shape.

Figure 8:
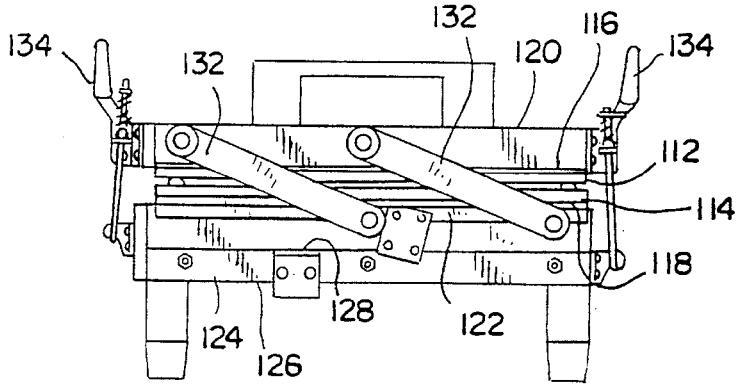
FIG. 8 is an end view of the bag thawer of FIG. 7.

FIG. 8 shows an end elevational view of bag thawer 110 of FIG. 7. A hinge 132 is pivotally attached to base 124 and upper back plate 120. The hinge 132 allows back plates 120, 122 to be separated. Contact plates 112, 114 are also separated because contact plates 112, 114 are coupled to back plates 120, 122 by heaters 116, 118, respectfully. When contact plates 112, 114 are separated, I.V. bag 42 can be placed into contact or out of contact with contact plates 112, 114.

Bag thawer 110 biases contact plates 112, 114 towards I.V. bag 42. This ensures contact between I.V. bag 42 and contact plates 112, 114 during a thawing procedure. A set of clamps 134, for example, may be utilized to bias contact plates 112, 114. The clamps 134 are attached to back plates 120, 122 to bias back plates 120, 122 towards each other. Therefore, clamps 134 are coupled to contact plates 112, 114 via back plates 120, 122 and heaters 116, 118. Clamps 134 may cooperate with springs 130 to ensure a continuous biasing force during thawing.

Figure 9:
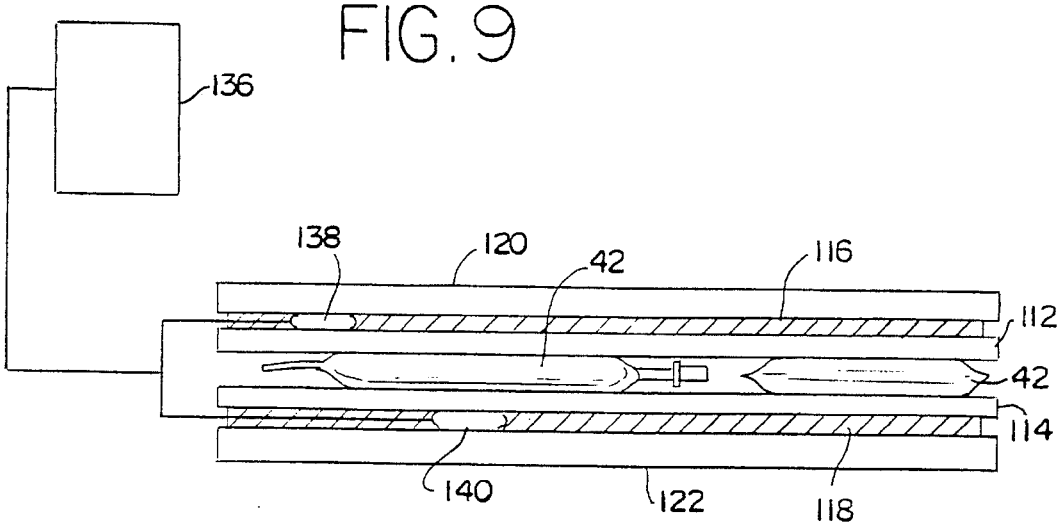
FIG. 9 is a partial view of the bag thawer of FIG. 7 along line A-A showing an I.V. bag positioned in the bag thawer.

FIG. 9 shows a cross-sectional view of a portion of bag thawer 110 of FIG. 7 along line A—A. A heater control 136 is electrically connected to heaters 116, 118. The heater control 136 controls the temperature of heaters 116, 118. By controlling the temperatures of heaters 116, 118, heater control 136 limits the temperatures of contact plates 112, 114. More specifically, heater control 136 limits the temperature of contact plates 112, 114 to a maximum temperature of approximately room temperature. Typically, room temperature is approximately 72° F. or 75° F. Thus, I.V. bag 42 is exposed to maximum temperature of room temperature.

A pair of thermocouples 138, 140 may be electrically connected to heater control 136. Each one of the thermocouples 138, 140 contact one contact plate 112, 114. Each one of the thermocouples 138, 140 may also contact one heater 116, 118. The thermocouples 138, 140 measure the temperature at these locations and send a signal to heater control 136. As such, heater control 136 controls the temperatures of heaters 116, 118.

Various changes and modifications to the embodiments described herein will be apparent to those skilled in the art. Such changes and modifications can be made without departing from the spirit and scope of the present invention and without diminishing its attendant advantages. Therefore, the inventors intend that such changes and modifications be covered by the appended claims.

What is claimed is:

1. A device adapted to thaw frozen liquid contained in at least one bag comprising:

an upper contact plate having a size such that when the upper contact plate is at room temperature the upper contact plate contains a first quantity of room temperature heat;

a lower contact plate having a size such that when the lower contact plate is at room temperature the lower contact plate contains a second quantity of room temperature heat, the upper contact plate and the lower contact plate being sized such that the first quantity of room temperature heat combined with the second quantity of room temperature heat is capable of completely thawing the frozen liquid;

a hinge movably connecting the upper contact plate to the lower contact plate at a hinged location; and means attached to the upper contact plate and the lower contact plate for biasing the upper contact plate towards the lower contact plate.

2. The device of claim 1 wherein the means for biasing comprises:

a pair of rocker arms, each rocker arm pivotally attached to the upper contact plate;

a clamp handle attached to the pair of rocker arms; and a pair of springs, each spring having a first spring end and a second spring end, the first spring end removably attached to the lower contact plate and the second spring end removably attached to the rocker arm.

3. The device of claim 2 wherein each rocker arm is pivotal from a first rocker arm position to a second rocker arm position, in the first rocker arm position each spring has a first biasing force between the upper contact plate and the lower contact plate, in the second rocker arm position each spring has a second biasing force between the upper contact plate and the lower contact plate, the second biasing force being greater than the first biasing force.

4. The device of claim 3 wherein the first biasing force of each spring is approximately 0 lbs.

5. The device of claim 3 wherein the second biasing force of each spring generates a combined biasing force of approximately 15 lbs. to 30 lbs.

6. The device of claim 1 wherein the hinge allows the upper contact plate to pivot at the hinged location and allows the upper contact plate to move away from the lower contact plate at the hinged location.

7. The device of claim 6 further comprising a projection connected to the upper contact plate at the hinged location, and wherein the lower contact plate defines a seat at the hinged location, the projection and the seat being adapted to cooperate with each other to form the hinge.

8. The device of claim 7 wherein the projection extends across a width of the upper contact plate and the seat extends across a width of the lower contact plate.

9. The device of claim 1 further comprising means for mounting the lower contact plate on a wall.

10. The device of claim 1 wherein the means for biasing generates a biasing force of approximately 15 lbs. to 30 lbs.

11. The device of claim 1 further comprising at least one foot attached to the lower contact plate for supporting the lower contact plate on a table.

12. The device of claim 11 wherein the foot is removable from the lower contact plate and the device further comprises means for mounting the lower contact plate on a wall.

13. The device of claim 12 wherein the means for mounting comprises at least one bracket attached to the lower contact plate.

14. The device of claim 12 wherein the means for mounting comprises at least one support recess adapted to cooperate with a bracket attached to a wall.

15. The device of claim 1 wherein the frozen liquid is contained in at least one I.V. bag.

16. The device of claim 1 wherein the room temperature is a range of approximately 72° F.–75° F.

17. A method for thawing frozen liquid contained in at least one bag comprising the steps of:

providing an upper contact plate having a size such that when the upper contact plate is at room temperature the upper contact plate contains a first quantity of room temperature heat;

providing a lower contact plate having a size such that when the lower contact plate is at room temperature the lower contact plate contains a second quantity of room temperature heat, the upper contact plate and the lower contact plate being sized such that the first quantity of room temperature heat combined with the second quantity of room temperature heat is capable of completely thawing the frozen liquid;

placing at least one bag of frozen liquid in contact with the lower contact plate and the upper contact plate;

biasing the upper contact plate towards the lower contact plate; and transferring heat from the lower contact plate and the upper contact plate to the bag of frozen liquid at a location where the contact plates contact the bag to generate a thawed bag of liquid.

18. The method of claim 17 further comprising the steps of:

removing the thawed bag of liquid from contact with the lower contact plate and the upper contact plate;

contacting the lower and upper contact plates with room temperature air;

transferring heat from the room temperature air to the upper and lower contact plates at a location where the air contacts the contact plates; and, heating the lower contact plate and the upper contact plate to room temperature with the room temperature air.

19. The method of claim 17 wherein the step of biasing further comprises the steps of:

pivoting a rocker arm attached to the upper contact plate; and stretching a spring attached to the rocker arm and the lower contact plate.

20. A bag thawer adapted to thaw frozen liquid contained in at least one bag having opposite sides comprising:

a pair of contact plates, each contact plate having a first side capable of being in contact with one of the opposite sides of the bag containing the frozen liquid;

a pair of heaters, each heater in direct contact with one of the contact plates on a second side of each contact plate opposite from the first sides;

a pair of back plates, each back plate coupled to one of the heaters on a side of each heater opposite from the contact plates;

a heater control electrically connected to the pair of heaters and limiting a maximum temperature of each of the heaters such that the contact plates reach a maximum contact plate temperature of approximately room temperature; and means coupled to the pair of contact plates for biasing the pair of contact plates towards the bag.

21. The bag thawer of claim 20 wherein the room temperature is a range of approximately 72° F. –75° F.

22. The bag thawer of claim 20 further comprising a pair of thermocouples electrically connected to the heater control, each one of the thermocouples contacting one of the contact plates to sense the temperatures of the contact plates.

23. The bag thawer of claim 20 further comprising:

a base for supporting the bag thawer on a table, the base having a bottom side facing the table and a top side facing away from the table; and a resilient support flexibly supporting one of the pair of back plates on the top side of the base.

24. The bag thawer of claim 23 wherein the resilient support comprises a set of springs.

25. The bag thawer of claim 23 wherein the back plate supported by the resilient support is a lower back plate and the other back plate is an upper back plate, the bag thawer further comprising a hinge attached to the base and the upper back plate;

the hinge allowing the pair of contact plates to be separated such that the I.V. bag can be removed from contact with the contact plates; and wherein the means for biasing comprises a set of clamps, each clamp attached to the base and to the upper back plate.

26. The device of claim 20 wherein the frozen liquid is contained in at least one I.V. bag.

27. A method for thawing a frozen liquid contained in at least one bag having opposite sides comprising the steps of:

providing a pair of contact plates at room temperature, each contact plate having a first side capable of being in contact with one of the opposite sides of the bag;

biasing the contact plates towards the bag;

transferring heat at room temperature from the contact plates to the bag;

providing a pair of heaters, each heater being in direct contact with one of the contact plates on a second side of each contact plate opposite from the first sides;

maintaining the temperature of the contact plates at room temperature by transferring heat from the heaters to the contact plates; and controlling the temperature of the heaters to prevent the liquid contained in the bag from reaching a temperature above room temperature.

28. The method of claim 27 wherein the step of controlling the temperature of the heaters comprises the step of sensing the temperature of the heaters with a thermocouple.

29. The method of claim 27 wherein the step of providing a pair of contact plates at room temperature in contact with opposite sides of the bag comprises the step of flexibly supporting one contact plate for parallel and unparallel alignment of the contact plates.

* * * * *